(12) United States Patent
Lehtiniemi et al.

(10) Patent No.: US 11,943,603 B2
(45) Date of Patent: Mar. 26, 2024

(54) CONTROLLING AN AUDIO SOURCE DEVICE

(71) Applicant: Nokia Technologies Oy, Espoo (FI)

(72) Inventors: Arto Juhani Lehtiniemi, Lempäälä (FI); Lasse Laaksonen, Tampere (FI); Mikko-Ville Laitinen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 14 days.

(21) Appl. No.: 17/518,198

(22) Filed: Nov. 3, 2021

(65) Prior Publication Data

US 2022/0167110 A1 May 26, 2022

(30) Foreign Application Priority Data

Nov. 20, 2020 (EP) ..................................... 20208890

(51) Int. Cl.
*H04S 7/00* (2006.01)
*G06F 3/16* (2006.01)
*G10K 11/178* (2006.01)

(52) U.S. Cl.
CPC ........ *H04S 7/303* (2013.01); *G10K 11/17823* (2018.01); *G10K 11/17827* (2018.01); *H04S 2400/11* (2013.01); *H04S 2420/01* (2013.01)

(58) Field of Classification Search
None
See application file for complete search history.

(56) References Cited

U.S. PATENT DOCUMENTS

| 9,621,989 | B1 | 4/2017 | Garner et al. |
| 10,638,248 | B1 * | 4/2020 | Dodds ............... G10K 11/17813 |
| 2006/0103334 | A1 * | 5/2006 | Abali ..................... F04D 25/166 318/67 |
| 2013/0015801 | A1 * | 1/2013 | Ady ....................... G11B 33/142 318/460 |

(Continued)

FOREIGN PATENT DOCUMENTS

| EP | 3108646 A1 | 12/2016 |
| JP | 2018-081481 A | 5/2018 |

(Continued)

OTHER PUBLICATIONS

Extended European Search Report received for corresponding European Patent Application No. 20208890.2, dated Apr. 28, 2021, 10 pages.

(Continued)

*Primary Examiner* — Qin Zhu
(74) *Attorney, Agent, or Firm* — ALSTON & BIRD LLP (57) ABSTRACT

An apparatus, method and computer program product for: receiving information on a position of at least one user with respect to a spatial audio field provided by an audio source device, determining an audio volume level at the position of the at least one user, receiving information relating to background noise generated by the audio source device when providing the spatial audio field, determining, based on the audio volume level at the position of the at least one user and the information relating to the background noise, control information for controlling the audio source device, and controlling the audio source device based on the control information when providing the spatial audio field.

18 Claims, 5 Drawing Sheets

(56) References Cited

U.S. PATENT DOCUMENTS

| | | | |
|---|---|---|---|
| 2014/0360805 A1* | 12/2014 | Berkman | H04R 1/02 |
| | | | 181/141 |
| 2015/0382127 A1 | 12/2015 | Sun et al. | |
| 2016/0036987 A1* | 2/2016 | Cartwright | H04M 3/568 |
| | | | 381/17 |
| 2016/0125867 A1 | 5/2016 | Jarvinen et al. | |
| 2022/0159403 A1* | 5/2022 | Sporer | G06T 7/70 |

FOREIGN PATENT DOCUMENTS

| | | |
|---|---|---|
| WO | 2015/127194 A1 | 8/2015 |
| WO | 2020/159557 A1 | 8/2020 |

OTHER PUBLICATIONS

Office Action for European Application No. 20208890.2 dated Nov. 20, 2023, 11 pages.

\* cited by examiner

CONTROLLING AN AUDIO SOURCE DEVICE

TECHNICAL FIELD

The present application relates generally to controlling the audio source device. More specifically, the present application relates to controlling the audio source device when providing a spatial audio field.

BACKGROUND

The amount of multimedia content increases continuously. Users create and consume multimedia content, and it has a big role in modern society.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising means for performing: receiving information on a position of at least one user with respect to a spatial audio field provided by an audio source device, determining an audio volume level at the position of the at least one user, receiving information relating to background noise generated by the audio source device when providing the spatial audio field, determining, based on the audio volume level at the position of the at least one user and the information relating to the background noise, control information for controlling the audio source device, and controlling the audio source device based on the control information when providing the spatial audio field.

According to a second aspect of the invention, there is provided a method comprising: receiving information on a position of at least one user with respect to a spatial audio field provided by an audio source device, determining an audio volume level at the position of the at least one user, receiving information relating to background noise generated by the audio source device when providing the spatial audio field, determining, based on the audio volume level at the position of the at least one user and the information relating to the background noise, control information for controlling the audio source device, and controlling the audio source device based on the control information when providing the spatial audio field.

According to a third aspect of the invention, there is provided a computer program comprising instructions for causing an apparatus to perform at least the following: receiving information on a position of at least one user with respect to a spatial audio field provided by an audio source device, determining an audio volume level at the position of the at least one user, receiving information relating to background noise generated by the audio source device when providing the spatial audio field, determining, based on the audio volume level at the position of the at least one user and the information relating to the background noise, control information for controlling the audio source device, and controlling the audio source device based on the control information when providing the spatial audio field.

According to a fourth aspect of the invention, there is provided an apparatus comprising at least one processor and at least one memory including computer program code, the at least one memory and the computer program code configured to with the at least one processor, cause the apparatus at least to: receive information on a position of at least one user with respect to a spatial audio field provided by an audio source device, determine an audio volume level at the position of the at least one user, receive information relating to background noise generated by the audio source device when providing the spatial audio field, determine, based on the audio volume level at the position of the at least one user and the information relating to the background noise, control information for controlling the audio source device, and control the audio source device based on the control information when providing the spatial audio field.

According to a fifth aspect of the invention, there is provided a non-transitory computer readable medium comprising program instructions for causing an apparatus to perform at least the following: receiving information on a position of at least one user with respect to a spatial audio field provided by an audio source device, determining an audio volume level at the position of the at least one user, receiving information relating to background noise generated by the audio source device when providing the spatial audio field, determining, based on the audio volume level at the position of the at least one user and the information relating to the background noise, control information for controlling the audio source device, and controlling the audio source device based on the control information when providing the spatial audio field.

According to a sixth aspect of the invention, there is provided a computer readable medium comprising program instructions for causing an apparatus to perform at least the following: receiving information on a position of at least one user with respect to a spatial audio field provided by an audio source device, determining an audio volume level at the position of the at least one user, receiving information relating to background noise generated by the audio source device when providing the spatial audio field, determining, based on the audio volume level at the position of the at least one user and the information relating to the background noise, control information for controlling the audio source device, and controlling the audio source device based on the control information when providing the spatial audio field.

BRIEF DESCRIPTION OF THE DRAWINGS

Some example embodiments will now be described with reference to the accompanying drawings.

DETAILED DESCRIPTION

The following embodiments are exemplifying. Although the specification may refer to "an", "one", or "some"

embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to controlling an audio source device in order to reduce an effect of background noise generated by the audio source device on user experience of spatial audio content.

According to an example embodiment, an apparatus is configured to receive information on a position of at least one user with respect to a spatial audio field provided by an audio source device, determine an audio volume level at the position of the at least one user, receive information relating to background noise generated by the audio source device when providing the spatial audio field, determine, based on the audio volume level at the position of the at least one user and the information relating to the background noise, control information for controlling the audio source device, and control the audio source device based on the control information when providing the spatial audio field.

As spatial audio is becoming more popular in games, movies and music, a need for computational power increases as well. However, as a consequence of increased computational power, also a need for cooling increases. Many devices include a cooling fan for cooling the device, but the fan noise may be very disturbing, especially if a user is listening to audio content.

Figure 1:
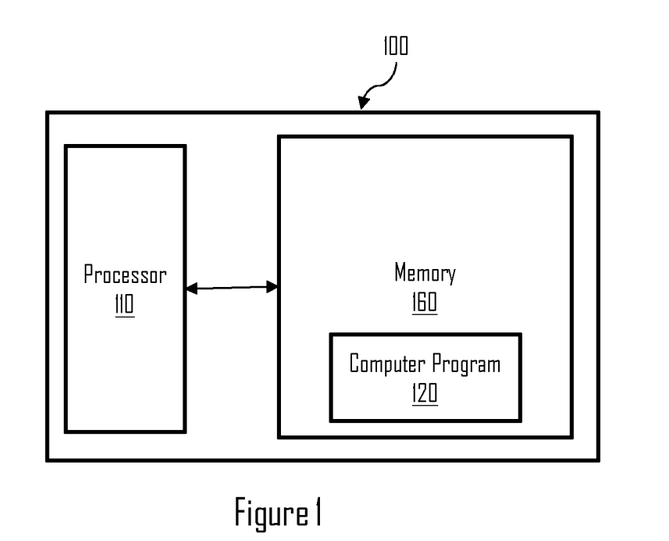
FIG. 1 shows a block diagram of an example apparatus in which examples of the disclosed embodiments may be applied.

FIG. 1 is a block diagram depicting an apparatus 100 operating in accordance with an example embodiment of the invention. The apparatus 100 may be, for example, an electronic device such as a chip or a chipset. The apparatus 100 comprises one or more control circuitry, such as at least one processor 110 and at least one memory 160, including one or more algorithms such as computer program code 120 wherein the at least one memory 160 and the computer program code are 120 configured, with the at least one processor 110 to cause the apparatus 100 to carry out any of example functionalities described below.

In the example of FIG. 1, the processor 110 is a control unit operatively connected to read from and write to the memory 160. The processor 110 may also be configured to receive control signals received via an input interface and/or the processor 110 may be configured to output control signals via an output interface. In an example embodiment the processor 110 may be configured to convert the received control signals into appropriate commands for controlling functionalities of the apparatus 100.

The at least one memory 160 stores computer program code 120 which when loaded into the processor 110 control the operation of the apparatus 100 as explained below. In other examples, the apparatus 100 may comprise more than one memory 160 or different kinds of storage devices.

Computer program code 120 for enabling implementations of example embodiments of the invention or a part of such computer program code may be loaded onto the apparatus 100 by the manufacturer of the apparatus 100, by a user of the apparatus 100, or by the apparatus 100 itself based on a download program, or the code can be pushed to the apparatus 100 by an external device. The computer program code 120 may arrive at the apparatus 100 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

Figure 2:
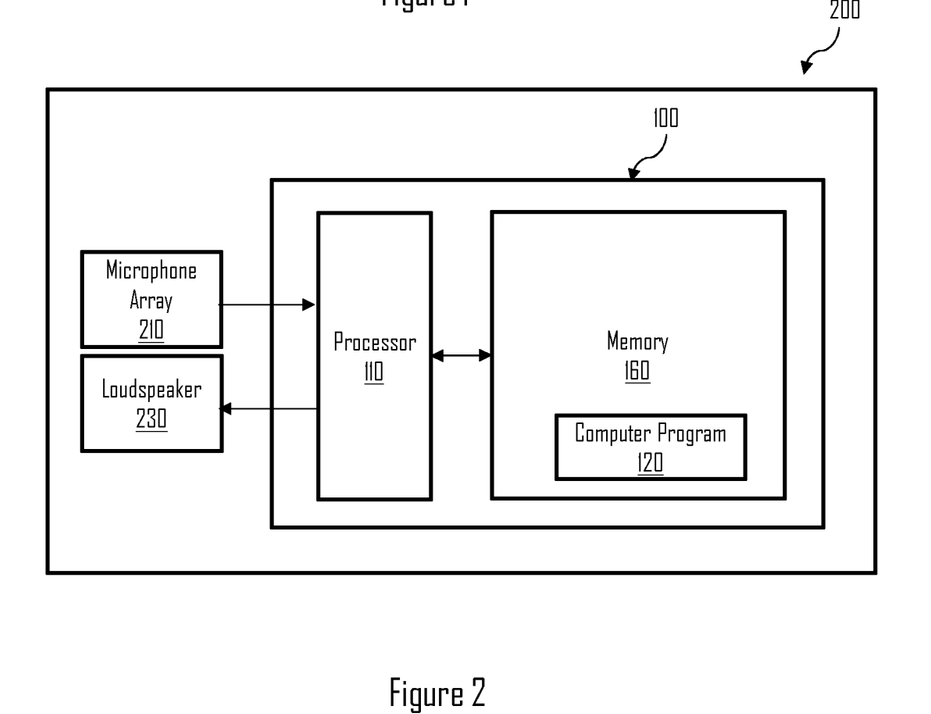
FIG. 2 shows a block diagram of another example apparatus in which examples of the disclosed embodiments may be applied.

FIG. 2 is a block diagram depicting an apparatus 200 in accordance with an example embodiment of the invention. The apparatus 200 may be an electronic device such as a hand-portable device, a mobile phone or a Personal Digital Assistant (PDA), a Personal Computer (PC), a laptop, a desktop, a tablet computer, a wireless terminal, a communication terminal, a game console, a music player, an electronic book reader (e-book reader), a positioning device, a digital camera, a household appliance, a loudspeaker, a CD-, DVD or Blu-ray player, or a media player.

In the example embodiment of FIG. 2, the apparatus 200 is illustrated as comprising the apparatus 100, a microphone array 210 and at least one loudspeaker 230. Instead of comprising a microphone array 210, and/or at least one loudspeaker 230, the apparatus 200 may be operatively connected to the microphone array 210 and/or the at least one loudspeaker 230. For example, the apparatus 200 may be configured to communicate with the microphone array 210, and/or the loudspeaker 230 over a wireless radio connection, or the like.

The apparatus 200 may further comprise a display configured to act as a user interface. For example, the display may be a touch screen display. In an example embodiment, the display and/or the user interface may be external to the apparatus 200, but in communication with it. The user interface may also comprise a manually operable control such as a button, a key, a touch pad, a joystick, a stylus, a pen, a roller, a rocker, a keypad, a keyboard or any suitable input mechanism for inputting and/or accessing information. Further examples include a camera, a speech recognition system, eye movement recognition system, acceleration-, tilt- and/or movement-based input systems. Therefore, the apparatus 200 may also comprise different kinds of sensors such as one or more gyro sensors, accelerometers, magnetometers, position sensors and/or tilt sensors.

According to an example embodiment, the apparatus 200 is configured to establish radio communication with at least one device using, for example, a Bluetooth, Wi-Fi, radio frequency identification (RFID), or a near field communication (NFC) connection.

According to an example embodiment, the apparatus 200 comprises an audio source device. According to another example embodiment, the apparatus 200 is operatively connected to an audio source device. The audio source device may comprise, for example, a gaming console, a computer, a household appliance, or the like.

An audio source device may comprise a device providing audio content such as spatial audio or multimedia content such as video content for playback. An audio source device may comprise an audio, video or other media player with a built-in hard disk or an audio/video/media player operatively connected to a hard disk such as a network server.

The audio source device may be configured to control reproduction of audio content. Controlling reproduction of spatial audio may comprise, for example, providing a spatial audio field and/or controlling one or more loudspeakers 230 configured to create a spatial audio field. A spatial audio field may be provided in a physical space such as a room using one or more loudspeakers located in the space or using headphones.

Spatial audio may comprise a full sphere surround-sound to mimic the way people perceive audio in real life. Spatial audio may comprise audio that appears from a user's position to be assigned to a certain direction and/or distance. Therefore, the perceived audio may change with the movement of the user or with the user turning. Spatial audio may comprise audio created by sound sources, ambient audio or a combination thereof. Ambient audio may comprise audio that might not be identifiable in terms of a sound source such as traffic humming, wind or waves, for example. The full sphere surround-sound may comprise a spatial audio field and the position of the user or the position of a capturing device may be considered as a reference point in the spatial audio field. According to an example embodiment, a reference point comprises the center of the audio field.

According to an example embodiment, the apparatus 200 is configured to communicate with other devices using, for example, a wireless radio connection such as Bluetooth.

According to an example embodiment, the apparatus 200 is configured to receive information relating to a spatial audio field. Information relating to a spatial audio field may comprise, for example, one or more characteristics of the spatial audio field, audio content provided in the spatial audio field, information on one or more users consuming audio content provided in the spatial audio field, or the like. The apparatus 200 may be configured to receive the information relating to the spatial audio field from one or more other devices or the apparatus 200 may be configured to determine the information relating to the spatial audio field based on, for example, measurement data.

According to an example embodiment, the apparatus 200 is configured to receive information on a position of at least one user with respect to a spatial audio field provided by the audio source device. The information on a position of the at least one user may comprise information indicating the position of the at least one user or data based on which the apparatus 200 may determine the position of the at least one user. The apparatus 200 may be configured to receive the information on a position of the at least one user from at least one microphone, camera and/or a mobile computing device of the user.

According to an example embodiment, the apparatus 200 is configured to determine a position of the at least one user with respect to a spatial audio field based on the information on a position of the at least one user.

A position of the at least one user may comprise a physical position or a virtual position. A physical position of the at least one user may comprise a physical position of the at least one user with respect to a spatial audio field provided in a particular space such as a room and a virtual position of the at least one user may comprise a position of the at least one user with respect to one or more audio objects in the spatial audio field.

An audio object may comprise one or more audio signals and associated metadata. An audio object may be associated with metadata that defines a location or trajectory of that object in the audio field. As well as specifying a location and/or movement of an object, the metadata may also define the type of object, for example, acoustic characteristics of an object, and/or the class of renderer that is to be used to render the object.

According to an example embodiment, the position of at least one user comprises a physical position of the at least one user in a space where the spatial audio field is provided. The space may comprise a physical space. The physical position of the at least one user may comprise a position of the at least one user with respect to one or more physical devices in the space. For example, the position of the at least one user may comprise, for example, a position of the at least one user with respect to positions of one or more loudspeakers or the audio source device.

A position of the at least one user with respect to a spatial audio field may comprise a position of the at least one user with respect to a reference point in the spatial audio field. For example, a position of the at least one user may comprise a position of the at least one user with respect to the center of the spatial audio field. As another example, a position of the at least one user may comprise a position of the at least one user with respect to at least one physical device providing the spatial audio field such as a position with respect to one or more loudspeakers, the audio source device, or the like. For example, a position of the at least one user may comprise a distance between the at least one user and one or more loudspeakers and/or a distance between the at least one user and the audio source device.

According to an example embodiment, the information on the position of the at least one user comprises an orientation of the at least one user. An orientation of the at least one user may comprise an orientation of the at least one user with respect to a reference point in the spatial audio field or an orientation of the at least one user with respect to a physical device providing the spatial audio field such as one or more loudspeakers or the audio source device.

According to an example embodiment, the apparatus is configured to analyze a direction of interest of the at least one user in the spatial audio field. A direction of interest of the at least one user may comprise a direction in the spatial audio field to which the at least one user pays attention.

The apparatus 200 may be configured to analyze a direction of interest of the at least user by modifying the spatial audio field and determining whether a position and/or orientation of the at least one user changes in response to the modification.

Without limiting the scope of the claims, an advantage of receiving information on a position of at least one user with respect to a spatial audio field is that one or more characteristics of audio content at the position of the at least one user may be determined and the spatial audio field may be controlled based on the one or more characteristics.

According to an example embodiment, the apparatus 200 is configured to determine one or more characteristics of the spatial audio field. For example, the apparatus 200 may be configured to determine an audio volume level in different parts or different directions of the spatial audio field.

The apparatus 200 may be configured to analyze spatial audio in different directions or parts of the spatial audio field by analyzing one or more loudspeaker outputs. Analyzing spatial audio may comprise, for example, analyzing a volume level or energy of the spatial audio in different directions or parts of the spatial audio field.

For example, the apparatus 200 may be configured to estimate energy for 5.1 multi-channel audio in a time-frequency domain denoted as $S_i(k, n)$ where i is the channel index, k the frequency band index, and n the temporal frame index.

The estimated energy may be used for estimating directions $\theta_j(k, n)$ for a pair of loudspeakers, an angle $\theta_0$ between the loudspeakers in the pair and a mean angle $\theta_{12}$ of the loudspeaker pair as follows:

$$\theta_j(k, n) = \arctan\left(\frac{\tan\theta_0(g_1 - g_2)}{g_1 + g_2}\right)\theta_{12}$$

where $$g_1 = \sqrt{E_1(k, n)}$$
$$g_2 = \sqrt{E_2(k, n)}$$

The estimated directions may be used for determining where reproduced spatial audio is perceived and the energy for the direction may be obtained as a sum of the energies $E_i(k, n)$ of the loudspeaker pair.

In some examples, coherence of loudspeaker signals in a pair of loudspeakers may be utilized in analyzing the direction in terms of coherent sounds being perceived to form a phantom source in between the loudspeakers, whereas incoherent sounds may be perceived to originate from the directions of the loudspeakers.

The apparatus 200 may also be configured to determine a dominant direction $\theta(k, n)$ in the spatial audio field. For example, the apparatus 200 may be configured to estimate energy for 5.1 multi-channel audio by forming direction vectors as follows:

$$V(k, n) = [x(k, n), y(k, n)]$$

where $$x(k, n) = \sum_i E_i(k, n)\cos(\theta_i)$$

$$y(k, n) = \sum_i E_i(k, n)\sin(\theta_i)$$

where $E_i$ is energy of the audio signal in a loudspeaker channel i and $\theta_i$ is an azimuth direction of the loudspeaker i.

The dominant direction $\theta(k, n)$ may then be determined as follows:

$$\theta(k, n) = \text{atan2}(y(k, n), x(k, n)).$$

According to an example embodiment, the apparatus 200 is configured to determine an audio volume level at the position of the at least one user.

Determining an audio volume level at the position of the at least one user may comprise, for example, measuring a volume level at the position of the at least one user or receiving information indicating an audio volume level at the position of the at least one user. The volume level at the position of the at least one user may be measured, for example, using one or more microphones. According to an example embodiment, determining an audio volume level at the position of the at least one user comprises analyzing output provided by at least one audio rendering device. The at least one audio rendering device may comprise, for example, one or more loudspeakers.

The audio source device may be configured to provide a spatial audio field and/or, for example, perform graphics rendering, which may be a computationally heavy process.

In order to avoid overheating the audio source device may comprise one or more cooling systems such as a cooling fan, a cooling water pump, or the like. The audio source device may be configured to turn on a cooling system when a temperature of the audio source device is above a threshold value such as a threshold temperature. However, the cooling system may cause audio interference such as background noise that may be disturbing for a user.

According to an example embodiment, the apparatus 200 is configured to receive information relating to background noise generated by the audio source device when providing the spatial audio field. The background noise may comprise noise that is separate from the audio content provided in the spatial audio field. The background noise may be disturbing for a user.

According to an example embodiment, the apparatus 200 is configured to receive information relating to background noise generated by the audio source by analyzing spatial audio in different directions or parts of the spatial audio field. For example, the apparatus 200 may be configured to determine that a direction of a particular type of audio corresponds to the direction of the audio source device and thereby deduce that the detected audio is background noise.

According to an example embodiment, analyzing spatial audio in different directions or parts of the spatial audio field may comprise determining a rate of change of an audio signal amplitude in a particular frequency band.

According to an example embodiment, the apparatus 200 is configured to receive information relating to background noise generated by the audio source from one or more microphones associated with the audio source device. For example, the one or more microphones may be close to the audio source device such that the background noise is dominating the sound level in the microphone signal thereby enabling the apparatus 200 to use the level of the microphone signal as a noise estimate.

According to an example embodiment, the apparatus 200 is configured to receive information relating to background noise generated by the audio source using acoustic echo cancellation (AEC). For example, the apparatus 200 may be configured to remove reproduced spatial audio from a captured microphone signal in order to determine the background noise level.

According to an example embodiment, the apparatus 200 is configured to receive information relating to background noise generated by the audio source in response to estimating the noise level based on a rotation speed of a cooling fan. For example, the apparatus 200 may receive information on different noise levels associated with different cooling fan speeds and estimate a noise level based on the cooling fan speed.

The apparatus 200 may be configured to receive information relating to background noise generated by the audio source device based on different combinations of analyzing spatial audio, receiving information from a microphone associated with the audio source device, AEC and/or estimating the noise level based on a rotation speed of a cooling fan.

According to an example embodiment, the background noise comprises sound generated by at least one system used for preventing the audio source device from overheating. According to another example embodiment, the background noise comprises sound generated by at least one system used for providing media content for playback by the audio source device. For example, the apparatus 200 may comprise a feature that causes indexing of a database on a hard disk. The database may comprise, for example, an audio database such as a music database or a graphics database. Indexing may take minutes or hours and thereby cause background noise.

According to an example embodiment, the audio source device comprises at least one cooling fan generating the background noise.

According to an example embodiment, the information relating to the background noise generated by the audio source device comprises a noise level.

According to an example embodiment, the apparatus 200 is configured to receive the information relating to the background noise generated by the audio source device from at least one microphone. The microphone may comprise, for example, a microphone of the audio source device or a separate microphone such as a microphone of a mobile computing device of the at least one user.

According to an example embodiment, the apparatus 200 is configured to determine, based on the audio volume level at the position of the at least one user and the information relating to the background noise, control information for controlling the audio source device.

The control information may comprise information for controlling a function of the audio source device or controlling the spatial audio field provided by the audio source device. For example, the control information may comprise an instruction to control the audio source device or a parameter value such as a target noise level, a maximum allowed noise level or a an instruction to modify the spatial audio field provided by the audio source device.

According to an example embodiment, the control information comprises a particular noise level. The particular noise level may comprise, for example, a maximum allowed noise level.

According to an example embodiment, the control information comprises a particular direction of particular audio content in the spatial audio field. For example, the control information may comprise an instruction to provide particular audio content in a particular direction.

Without limiting the scope of the claims, an advantage of determining control information for controlling the audio source device based on the audio volume level at the position of the at least one user and the information relating to the background noise is that customized control may be provided taking into account the position of the at least one user.

According to an example embodiment, the apparatus 200 is configured to control the audio source device based on the control information when providing the spatial audio field. In other words, the apparatus 200 may be configured to control the audio source device based on the control information during playback of audio content.

Controlling the audio source device may comprise controlling at least one function of the audio source device or controlling the spatial audio field provided by the audio source device. The at least one function may comprise, for example a cooling fan of the audio source device and controlling the spatial audio field provided by the audio source device may comprise, for example, controlling rendering of the spatial audio field.

According to an example embodiment, controlling the audio source device comprises controlling a rotation speed of the cooling fan. Controlling a rotation speed of the cooling fan may comprise increasing the speed of the cooling fan or decreasing the speed of the cooling fan.

The audio source device may comprise a plurality of cooling methods such as a plurality of cooling fans. In such a case, controlling the audio source device may comprise controlling the plurality of cooling methods by, for example, applying a control curve for controlling the plurality of cooling methods or switching one or more of cooling methods from a first mode to a second mode.

According to an example embodiment, controlling the audio source device comprises controlling rendering of the spatial audio field. Controlling rendering of the spatial audio field may comprise, for example, providing instructions and/or parameters to one or more rendering devices.

According to an example embodiment, controlling rendering of the spatial audio field comprises rotating the spatial audio field.

Rotating the spatial audio field comprises modifying one or more audio parameters such that the orientation of the spatial audio field with respect to a reference point is changed. Modifying one or more audio parameters may be performed in different manners for different formats of audio. For example, rotatable audio may be rotated by modifying metadata and ambisonics may be rotated by modifying rotation matrices.

According to an example embodiment, rotating a spatial audio field comprises moving an audio object from a first direction to a second direction. For example, assuming an audio object in a spatial audio field a located to the right from the reference point, rotating the spatial audio field may comprise moving the audio object to the left from the reference point.

Without limiting the scope of the claims, an advantage of moving an audio object from a first direction to a second direction is that even if the user does not move, the user can better concentrate on the audio object as it is in a direction different from the device generating background noise. Another advantage of moving an audio object from a first direction to a second direction is that if the user moves away from the device generating background noise, it is easier to mask the background noise.

The apparatus 200 may be configured to rotate the spatial audio field based on one or more directions with the largest amount of energy. For example, the apparatus 200 may be configured to rotate the spatial audio field such that the directions with the largest amount of energy correspond with a direction of the audio source device. The apparatus 200 may further be configured to determine whether the audio content in a direction with the largest energy remains relatively static in order to avoid constantly rotating the spatial audio field. The apparatus 200 may be configured to maintain the rotated spatial audio field until the background noise is below a predetermine threshold value.

According to an example embodiment, the apparatus 200 is configured to provide a plurality of spatial audio fields and rotate the plurality of spatial audio fields independent of each other.

Without limiting the scope of the claims, an advantage of rotating a spatial audio field is that, for example, a cooling system may continue running as needed, but the disturbance caused by the cooling system for a user may be reduced by masking the background noise. Another advantage is that by rotating the spatial audio field, a user may be lured to a position with less disturbance caused by the background noise.

According to an example embodiment, the apparatus 200 comprises means for performing the features of the claimed invention, wherein the means for performing comprises at least one processor 110, at least one memory 160 including computer program code 120, the at least one memory 160 and the computer program code 120 configured to, with the at least one processor 110, cause the performance of the apparatus 200. The means for performing the features of the claimed invention may comprise means for receiving information on a position of at least one user with respect to a spatial audio field provided by an audio source device, means for determining an audio volume level at the position of the at least one user, means for receiving information relating to background noise generated by the audio source device when providing the spatial audio field, means for determining, based on the audio volume level at the position of the at least one user and the information relating to the background noise, control information for controlling the audio source device, and means for controlling the audio source device based on the control information when providing the spatial audio field.

The apparatus 200 may further comprise means for receiving the information relating to the background noise generated by the audio source device from at least one microphone.

Figure 3:
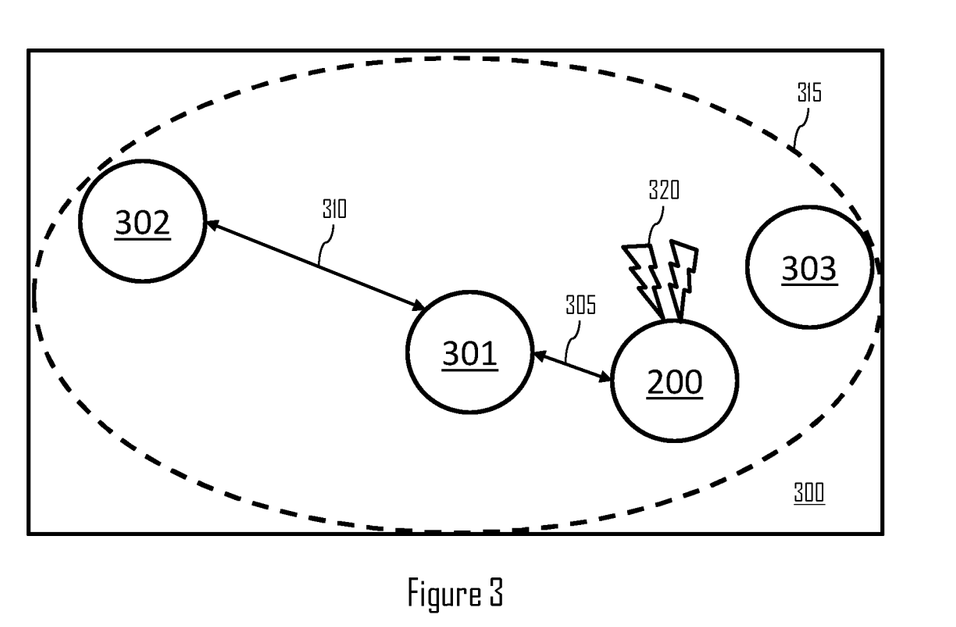
FIG. 3 illustrates an example of controlling an audio source device.

FIG. 3 illustrates an example of a spatial audio field provided by audio source device and rendered by a plurality of loudspeakers. In the example of FIG. 3, it is assumed that the audio source device comprises the apparatus 200 and a cooling fan that generates background noise 320. The spatial audio field is provided in a physical space such as a room 300.

In the example of FIG. 3, a spatial audio field 315 is provided by the apparatus 200 and rendered by the plurality of loudspeakers 302, 303.

The apparatus 200 receives information on a position of a user 301 in terms of a distance 305 between the user 301 and the apparatus 200 and a distance 310 between the user 301 and the loudspeaker 302, and determine that the user 301 is closer to the apparatus 200 than the loudspeaker 302. The apparatus 200 may receive the information on a position of the user 301 from, for example, at least one microphone, camera and/or a mobile computing device of the user 301.

The apparatus 200 determines an audio volume level at the position of the user 301 and receives information relating to background noise 320 generated by the apparatus 200 when providing the spatial audio field 315. In the example of FIG. 3, it is assumed that the information relating to the background noise 320 comprises a noise level.

The apparatus 200 determines, based on the audio volume level at the position of the user 301 and the noise level, control information for controlling the cooling fan of the apparatus 200. As the user 301 is closer to the apparatus 200 than the loudspeaker 302, the apparatus 200 may determine, depending on the noise level and the audio volume level at the position of the user 301, that the rotation speed of the cooling fan needs to be reduced in order to reduce disturbances caused by the cooling fan for the user.

Figure 4:
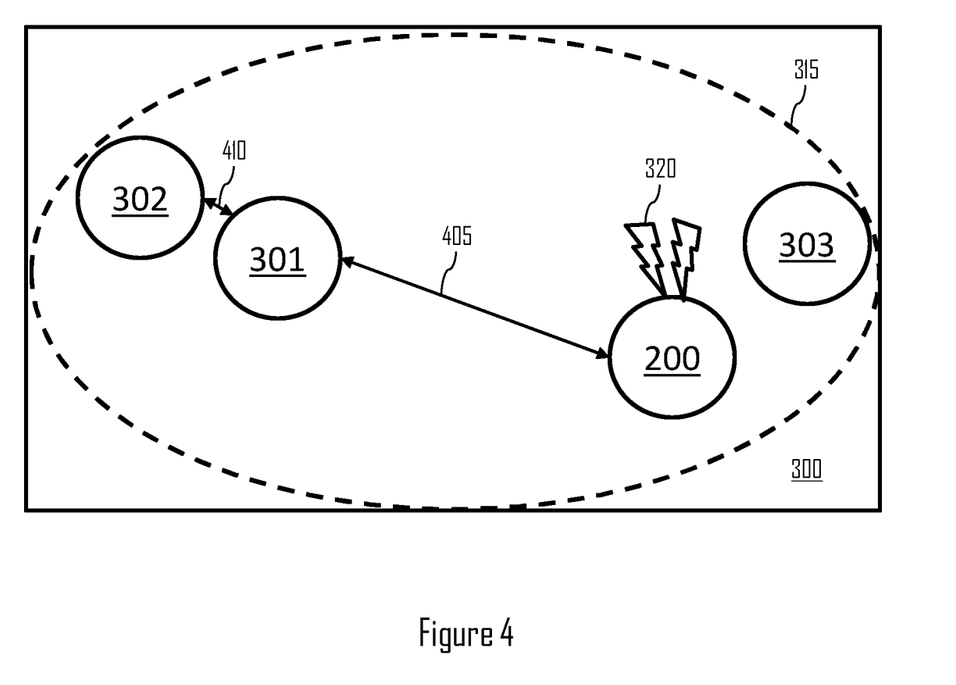
FIG. 4 illustrates another example of controlling an audio source device.

FIG. 4 illustrates another example of a spatial audio field provided by audio source device and rendered by a plurality of loudspeakers. Similarly to FIG. 3, it is assumed that the audio source device comprises the apparatus 200 and a cooling fan that generates background noise 320. The spatial audio field is provided in a physical space such as a room 300.

In the example of FIG. 4, a spatial audio field 315 is provided by the apparatus 200 and rendered by the plurality of loudspeakers 302, 303.

The apparatus 200 receives information on a position of a user 301 in terms of a distance 405 between the user 301 and the apparatus 200 and a distance 410 between the user 301 and the loudspeaker 302, and determine that the user 301 is closer to the loudspeaker 302 than the apparatus 200. The apparatus 200 may receive the information on a position of the user 301 from, for example, at least one microphone, camera and/or a mobile computing device of the user 301.

The apparatus 200 determines an audio volume level at the position of the user 301 and receives information relating to background noise 320 generated by the apparatus 200 when providing the spatial audio field 315. In the example of FIG. 4, it is assumed that the information relating to the background noise 320 comprises a noise level.

The apparatus 200 determines, based on the audio volume level at the position of the user 301 and the noise level, control information for controlling the cooling fan of the apparatus 200. As the user 301 is closer to the loudspeaker 302 than the apparatus 200, the apparatus 200 may determine, depending on the noise level and the audio volume level at the position of the user 301, that the rotation speed of the cooling fan may be increased in order to improve cooling of the apparatus 200.

Figure 5A:
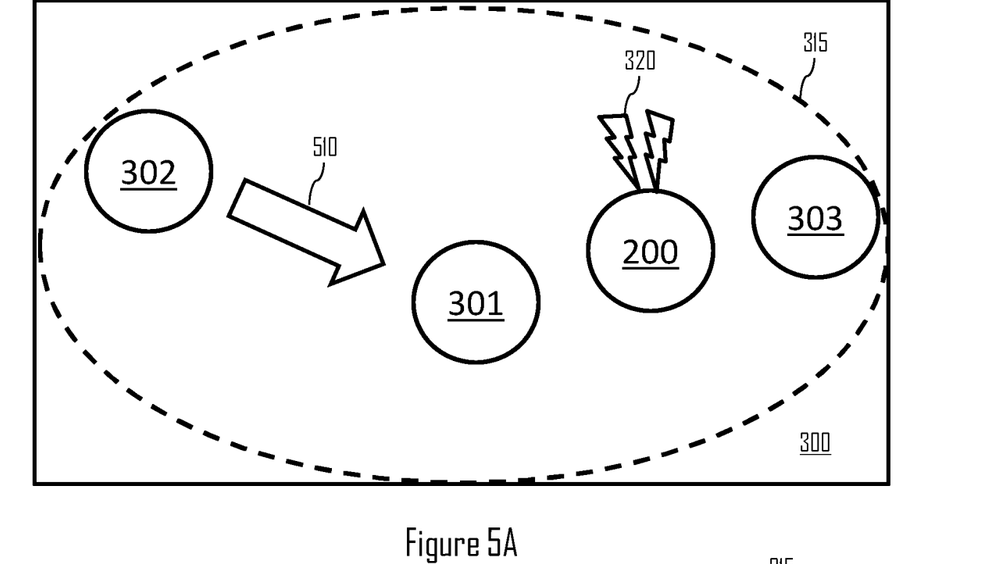
FIGS. 5A and 5B illustrate a further example of controlling an audio source device.
Figure 5B:
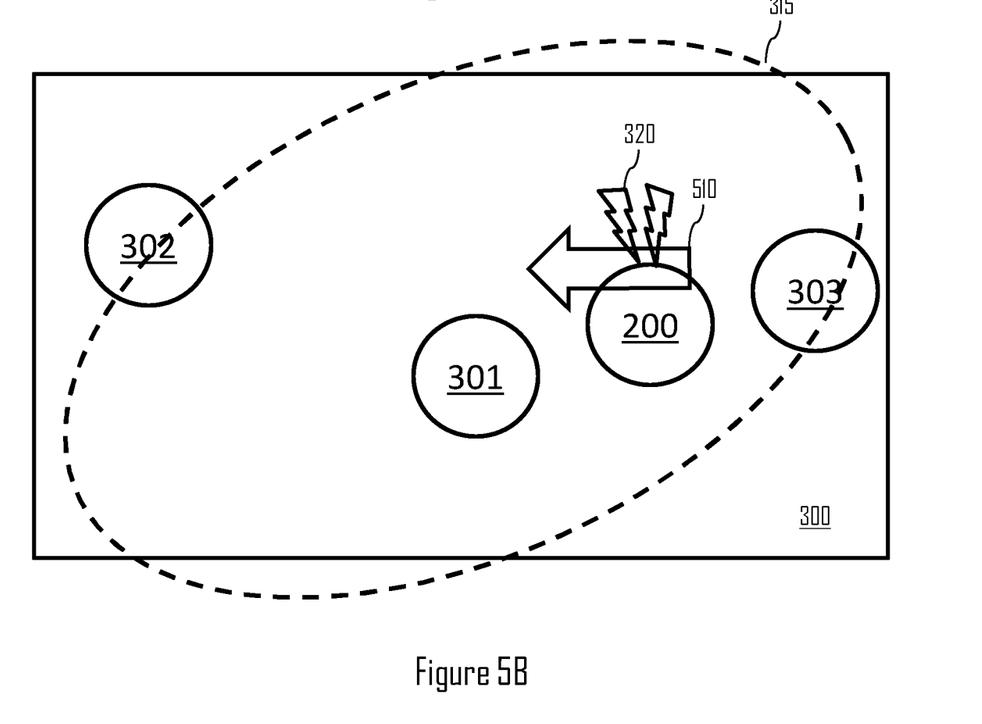

FIGS. 5A and 5B illustrate an example of a spatial audio field provided by audio source device and rendered by a plurality of loudspeakers. Similarly to FIGS. 3 and 4, it is assumed that the audio source device comprises the apparatus 200 and a cooling fan that generates background noise 320. The spatial audio field is provided in a physical space such as a room 300.

In the example of FIG. 5A, a spatial audio field 315 is provided by the apparatus 200 and rendered by the plurality of loudspeakers 302, 303. The apparatus 200 is further configured to analyze audio content in different directions of the spatial audio field and determine a direction with the most energy. In the example of FIG. 5A a direction with the most energy is illustrated by arrow 510.

The apparatus 200 receives information on a position of a user 301 and determines an audio volume level at the position of the user 301 and receives information relating to background noise 320 generated by the apparatus 200 when providing the spatial audio field 315. In the example of FIG. 5A, it is assumed that the information relating to the background noise 320 comprises a noise level.

The apparatus 200 determines, based on the audio volume level at the position of the user 301 and the noise level, control information for controlling rendering of the spatial audio field 315. In the example of FIG. 5, the apparatus 200 determines that the background noise level is relatively low and may be masked by the spatial audio field 315. Thereby, the apparatus 200 determines that the spatial audio field 315 needs to be rotated in order to mask the background noise 320.

FIG. 5B illustrates a rotated spatial audio field 315. In the example of FIG. 5B the spatial audio field is rotated such that the direction 510 with the most energy corresponds to the direction of the apparatus 200 thereby masking the background noise 320.

Rotating the spatial audio field may comprise modifying one or more audio parameters such that the orientation of the spatial audio field with respect to a reference point is changed. In the example of FIG. 5B, the reference point comprises the position of the user 301. As mentioned above, modifying one or more audio parameters may be performed in different manners for different formats of audio. For example, rotatable audio may be rotated by modifying metadata, and ambisonics may be rotated by modifying rotation matrices.

Figure 6A:
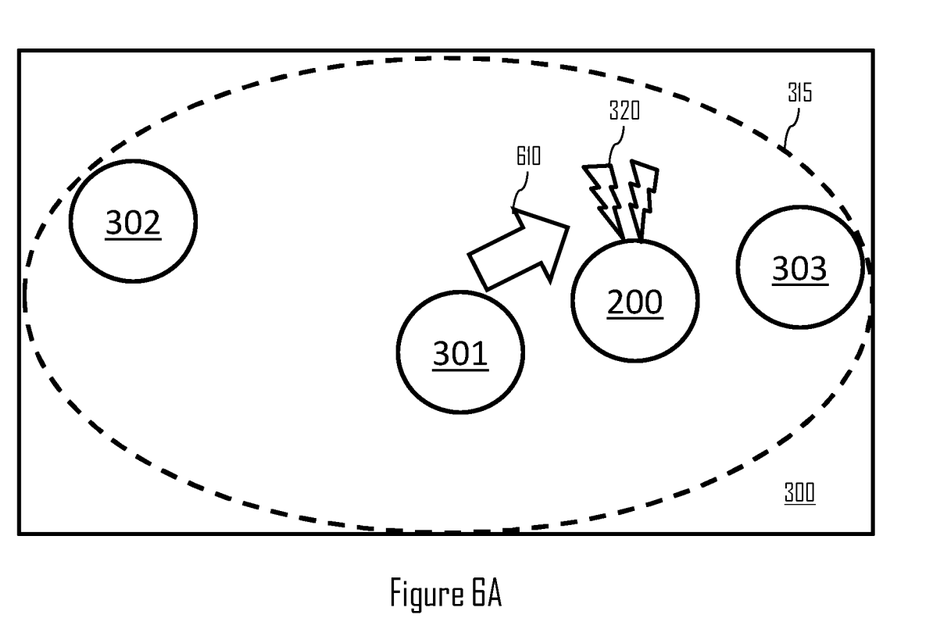
FIGS. 6A and 6B illustrate a yet further example of controlling an audio source device.
Figure 6B:
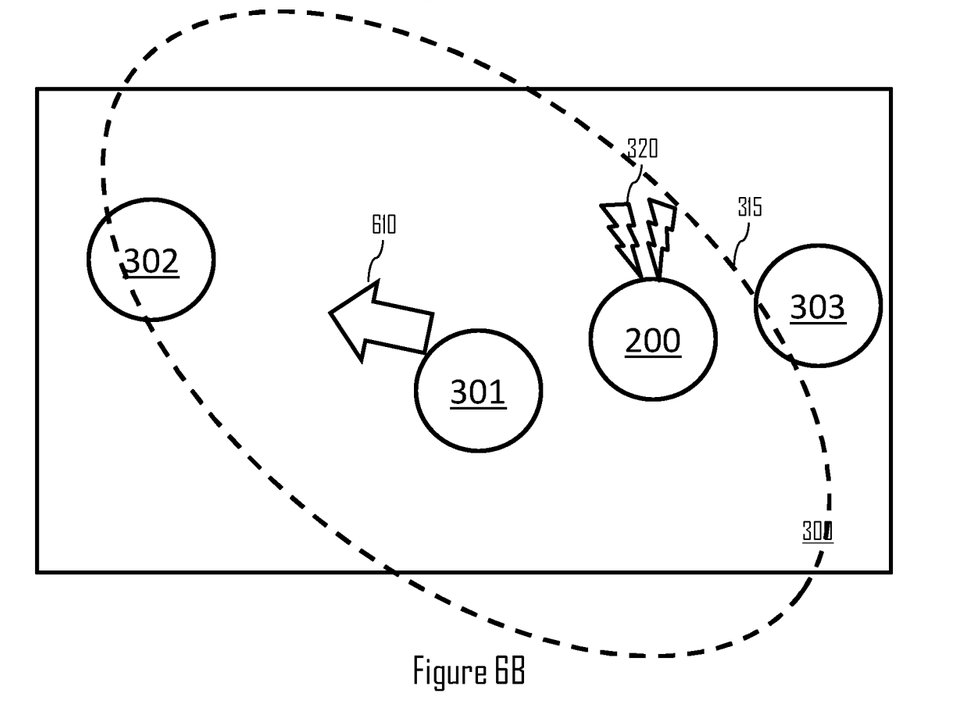

FIGS. 6A and 6B illustrate an example of a spatial audio field provided by audio source device and rendered by a plurality of loudspeakers. It is assumed that the audio source device comprises the apparatus 200 and a cooling fan that generates background noise 320. The spatial audio field is provided in a physical space such as a room 300.

In the example of FIG. 6A, a spatial audio field 315 is provided by the apparatus 200 and rendered by the plurality of loudspeakers 302, 303. The apparatus 200 is further configured to analyze audio content in different directions of the spatial audio field and determine a direction with the most energy. In the example of FIG. 6A a direction with the most energy is illustrated by arrow 610.

The apparatus 200 receives information on a position of a user 301 and determines an audio volume level at the position of the user 301 and receives information relating to background noise 320 generated by the apparatus 200 when providing the spatial audio field 315. In the example of FIG.

6A, it is assumed that the information relating to the background noise 320 comprises a noise level.

The apparatus 200 determines, based on the audio volume level at the position of the user 301 and the noise level, control information for controlling rendering of the spatial audio field. In the example of FIG. 6A, the apparatus 200 determines that the background noise level is relatively high and it cannot be properly masked by the spatial audio field 315 assuming the position of the user 301 remains substantially the same.

In the example of FIG. 6A, the apparatus 200 determines that the spatial audio field need to be rotated in order to lure the user 301 further away from the apparatus 200.

FIG. 6B illustrates a rotated spatial audio field 315. In the example of FIG. 6B the spatial audio field 315 is rotated such that the direction 610 with the most energy corresponds to the direction different from the direction of the apparatus 200. In this way the user may be lured away from the apparatus 200 such that the user experience is less affected by the background noise 320.

Rotating the spatial audio field 315 may comprise modifying one or more audio parameters such that the orientation of the spatial audio field 315 with respect to a reference point is changed. In the example of FIG. 6B, the reference point comprises the position of the user 301. As mentioned above, modifying one or more audio parameters may be performed in different manners for different formats of audio. For example, rotatable audio may be rotated by modifying metadata and ambisonics may be rotated by modifying rotation matrices.

Figure 7:
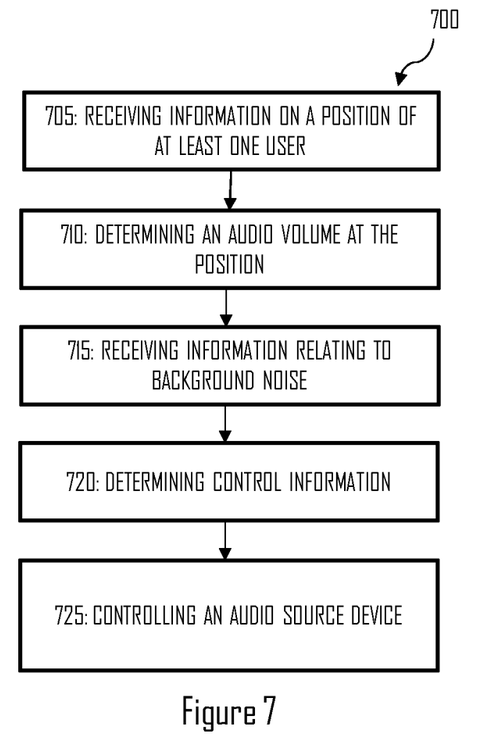
FIG. 7 illustrates an example method.

FIG. 7 illustrates an example method 700 incorporating aspects of the previously disclosed embodiments. More specifically the example method 700 illustrates controlling an audio source device. The method may be performed by the apparatus 200.

The method starts with receiving 705 information on a position of at least one user with respect to a spatial audio field provided by an audio source device. The apparatus 200 may receive the information on a position of the user from, for example, at least one microphone, camera and/or a mobile computing device of the user.

The method continues with determining 710 an audio volume level at the position of the at least one user. Determining the audio volume level at the position of the at least one user may comprise analyzing output provided by at least one audio rendering device.

The method continues with receiving 715, information relating to background noise generated by the audio source device when providing the spatial audio field. The information relating to background noise may comprise, for example, background noise level.

The method further continues with determining 720, based on the audio volume level at the position of the at least one user and the information relating to the background noise, control information for controlling the audio source device.

The method further continues with controlling 725 the audio source device based on the control information when providing the spatial audio field. Controlling the spatial audio field may comprise, for example, controlling at least one cooling fan generating the background noise or controlling rendering of the spatial audio field. Controlling the fan may comprise controlling a rotation speed of the cooling fan. Controlling rendering of the spatial audio field may comprise rotating the spatial audio field.

Without limiting the scope of the claims, an advantage of controlling an audio source device based on an audio volume level at a position of at least one user and information relating to the background noise is that disturbance caused by the audio source device during playback of audio content may be reduced.

Without in any way limiting the scope, interpretation, or application of the claims appearing below, a technical effect of one or more of the example embodiments disclosed herein is that an audio source device may be controlled in different ways in different situations while minimizing disturbance caused by the audio source device.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising:
   at least one processor; and
   at least one memory including computer program code,
   the at least one memory and the computer program code configured to, with the at least one processor, cause the apparatus to perform at least the following:
   receive information on a position of at least one user with respect to a spatial audio field provided by an audio source device;
   determine an audio volume level at the position of the at least one user;
   receive information relating to background noise generated by the audio source device when providing the spatial audio field;
   determine, based on the audio volume level at the position of the at least one user and the information relating to the background noise, control information for controlling the audio source device; and
   control the audio source device based on the control information when providing the spatial audio field, wherein the apparatus is caused to control the audio source device by rotating the spatial audio field and maintaining rotation of the spatial audio field such that a direction of the spatial audio field with a largest amount of energy corresponds with a direction of the audio source device until a determination that the background noise satisfies a threshold value.

2. The apparatus according to claim 1, wherein the audio source device comprises at least one cooling fan generating the background noise.

3. The apparatus according to claim 2, wherein controlling the audio source device further comprises controlling a rotation speed of the cooling fan.

4. The apparatus according to claim 1, wherein controlling the audio source device further comprises controlling rendering of the spatial audio field.

5. The apparatus according to claim 1, wherein the apparatus is further caused to:
   receive the information relating to the background noise generated by the audio source device from at least one microphone.

6. The apparatus according to claim 1, wherein the information relating to the background noise generated by the audio source device comprises a noise level.

7. The apparatus according to claim 1, wherein information on the position of the at least one user comprises an orientation of the at least one user.

8. The apparatus according to claim 1, wherein determining an audio volume level at the position of the at least one user comprises analyzing output provided by at least one audio rendering device.

9. The apparatus according to claim 1, wherein the apparatus is further caused to:
   analyze a direction of interest of the at least one user in the spatial audio field by modifying the spatial audio field and determining whether a position or orientation of the at least one user changes responsive to modification of the spatial audio field.

10. The apparatus according to claim 1, wherein the position of at least one user comprises a physical position of the at least one user in a space where the spatial audio field is provided.

11. The apparatus according to claim 1, wherein the control information comprises a particular noise level or a particular direction of particular audio content in the spatial audio field.

12. A method comprising:
    receiving information on a position of at least one user with respect to a spatial audio field provided by an audio source device;
    determining an audio volume level at the position of the at least one user;
    receiving information relating to background noise generated by the audio source device when providing the spatial audio field;
    determining, based on the audio volume level at the position of the at least one user and the information relating to background noise, control information for controlling the audio source device; and
    controlling the audio source device based on the control information when providing the spatial audio field, wherein controlling the audio source device comprises rotating the spatial audio field and maintaining rotation of the spatial audio field such that a direction of the spatial audio field with a largest amount of energy corresponds with a direction of the audio source device until a determination that the background noise satisfies a threshold value.

13. The method according to claim 12, wherein the audio source device comprises at least one cooling fan generating the background noise.

14. The method according to claim 13, wherein controlling the audio source device further comprises controlling a rotation speed of the cooling fan.

15. The method according to claim 12, wherein controlling the audio source device further comprises controlling rendering of the spatial audio field.

16. The method according to claim 12, further comprising receiving the information relating to the background noise generated by the audio source device from at least one microphone.

17. The method according to claim 12, wherein the information relating to the background noise generated by the audio source device comprises a noise level.

18. A non-transitory computer readable medium comprising program instructions stored thereon for performing at least the following:
    receiving information on a position of at least one user with respect to a spatial audio field provided by an audio source device;
    determining an audio volume level at the position of the at least one user;
    receiving information relating to background noise generated by the audio source device when providing the spatial audio field;
    determining, based on the audio volume level at the position of the at least one user and the information relating to background noise, control information for controlling the audio source device; and
    controlling the audio source device based on the control information when providing the spatial audio field, wherein controlling the audio source device comprises rotating the spatial audio field and maintaining rotation of the spatial audio field such that a direction of the spatial audio field with a largest amount of energy corresponds with a direction of the audio source device until a determination that the background noise satisfies a threshold value.

* * * * *